United States Patent [19]

Courbin et al.

[11] 4,374,931

[45] Feb. 22, 1983

[54] PHOTOCHROMIC GLASS SUITABLE FOR OPHTHALMIC APPLICATIONS

[75] Inventors: Philippe Courbin, Veneux les Sablons, France; David J. Kerko, Corning, N.Y.; Jean P. Mazeau, Avon, France; David L. Morse, Corning, N.Y.

[73] Assignee: Corning Glass Works, Corning, N.Y.

[21] Appl. No.: 338,042

[22] Filed: Jan. 8, 1982

[51] Int. Cl.$^3$ .................. C03C 3/26; C03C 3/08; C03C 3/10

[52] U.S. Cl. ........................... 501/13; 501/56

[58] Field of Search ................... 501/13, 56

[56] References Cited

U.S. PATENT DOCUMENTS

| | | | |
|---|---|---|---|
| 3,208,860 | 9/1965 | Armistead et al. | 501/13 |
| 4,018,965 | 4/1977 | Kerko et al. | 501/13 |
| 4,102,693 | 7/1978 | Owen et al. | 501/13 |
| 4,130,437 | 12/1978 | Mazeau et al. | 501/13 |
| 4,168,339 | 9/1978 | Kerko et al. | 501/13 |
| 4,190,451 | 2/1980 | Hanes et al. | 501/13 |

*Primary Examiner*—Mark Bell
*Attorney, Agent, or Firm*—Clinton S. Janes, Jr.

[57] ABSTRACT

The present invention is concerned with the production of photochromic glass compositions consisting essentially, expressed in terms of weight percent on the oxide basis, as calculated from the batch, of

| | |
|---|---|
| $SiO_2$ | 52–59 |
| $B_2O_3$ | 18–23 |
| $Al_2O_3$ | 6–8 |
| $Li_2O$ | 1–2.5 |
| $Na_2O$ | 1–3 |
| $K_2O$ | 8–13 |
| $ZrO_2$ | 2–6 |
| $TiO_2$ | 0–3 | and containing, as analyzed in weight percent, of

| | |
|---|---|
| Ag | 0.17–0.22 |
| CuO | 0.012–0.019 |
| Cl | 0.29–0.35 |
| Br | 0.06–0.12 |
| PbO | 0.1–0.15 | exhibiting, in 0.4 mm cross section, a clear luminous transmittance in excess of 90%, a darkened luminous transmittance below about 45% at a temperature of 25° C., a darkened luminous transmittance below about 57% at a temperature of 40° C., and a half fading time at both temperatures of about five minutes.

2 Claims, No Drawings

PHOTOCHROMIC GLASS SUITABLE FOR OPHTHALMIC APPLICATIONS

BACKGROUND OF THE INVENTION

Photochromic or phototropic glasses, as such have been variously termed, had their genesis in U.S. Pat. No. 3,208,860. That patent generally disclosed the capability of silver halide crystals grown in situ in glass articles to impart photochromic behavior thereto. As stated therein, the preferred base glass compositions consisted essentially, in terms of weight percent on the oxide basis, of about 4-26% $Al_2O_3$, 4-26% $B_2O_3$, 40-76% $SiO_2$, and an alkali metal oxide selected from the group of 2-8% $Li_2O$, 4-15% $Na_2O$, 6-20% $K_2O$, 8-25% $Rb_2O$, and 10-30% $Cs_2O$, the sum of those four components constituting at least 85% of the total composition. The photochromic characteristics exhibited by those compositions resulted from the incorporation of silver and at least one halide selected from the group of Cl, Br, and I. The minimum amount of halide necessary to achieve photochromic properties was 0.2% Cl, 0.1% Br, and 0.08% I. Silver is included in at least the minimum indicated content of 0.2% where Cl is the effective halide, 0.05% where Br is the effective halide, and 0.03% where I is the effective halide. The patent also teaches the efficiency of adding small amounts of low temperature reducing agents, such as SnO, FeO, CuO, $As_2O_3$, and $Sb_2O_3$ to improve the photochromic behavior of the glass. Reference is made to that patent for a more detailed explanation of the mechanism of photochromism in glasses.

Currently, the largest commercial application for photochromic glass has been the manufacture of spectacle lenses, both as ophthalmic lenses and as non-prescription sunglasses. Prescription lenses, marketed under the trademark PHOTOGRAY by Corning Glass Works, Corning, New York, have comprised the greatest single segment of commercial sales. That glass has the following approximate composition, expressed in terms of weight percent on the oxide basis:

| | |
|---|---|
| $SiO_2$ | 55.6 |
| $B_2O_3$ | 16.4 |
| $Al_2O_3$ | 8.9 |
| $Li_2O$ | 2.65 |
| $Na_2O$ | 1.85 |
| $K_2O$ | 0.01 |
| BaO | 6.7 |
| CaO | 0.2 |
| PbO | 5.0 |
| $ZrO_2$ | 2.2 |
| Ag | 0.16 |
| CuO | 0.035 |
| Cl | 0.24 |
| Br | 0.145 |
| F | 0.19 |

Because the composition of PHOTOGRAY brand lenses resulted from compromises worked out between photochromic behavior and such physical and chemical properties as glass melting and forming capabilities, ophthalmic requirements, chemical durability, weathering resistance, and the like, research has been essentially continuous to produce glasses demonstrating better photochromic characteristics, while concomitantly exhibiting the chemical and physical properties necessary in the formation of ophthalmic products or in products for other applications.

For example, ophthalmic lenses have recently been marketed under the trademark PHOTOGRAY EXTRA by Corning Glass Works. The glass for such lenses darkens to a lower luminouos transmittance and fades to its original transmittance substantially more rapidly than the glass utilized in PHOTOGRAY brand lenses. The composition therefore is included within U.S. Pat. No. 4,190,451, that patent citing glasses consisting essentially, expressed in weight percent on the oxide basis, of

| | |
|---|---|
| $SiO_2$ | 20-65 |
| $Al_2O_3$ | 5-25 |
| $B_2O_3$ | 14-23 |
| $Li_2O$ | 0-2.5 |
| $Na_2O$ | 0-9 |
| $K_2O$ | 0-17 |
| $Cs_2O$ | 0-6 |
| $Li_2O + Na_2O + K_2O + Cs_2O$ | 8-20 |
| $P_2O_5$ | 0-25 |
| CuO | 0.004-0.02 |
| Ag | 0.15-0.3 |
| Cl | 0.1-0.25 |
| Br | 0.1-0.2 | wherein the molar ratio alkali metal oxide:$B_2O_3$ ranges between about 0.55-0.85, the composition is essentially free from divalent metal oxides other than CuO, and the weight ratio Ag:(Cl+Br) ranges about 0.65-0.95.

Ophthalmic lenses fabricated from the above compositions have been produced in accordance with the method utilized in the manufacture of conventional lenses, i.e., non-photochromic ophthalmic lenses. Hence, a glass blank is pressed from molten glass and the blank then ground and polished to the required prescription. As pressed, the glass blank is potentially photochromic, i.e., the blank is essentially non-photochromic but, after exposure to an appropriate heat treatment, it will display photochromic behavior when exposed to actinic radiation, principally ultraviolet radiation. Accordingly, at some stage of the lens making process, the glass will be subjected to a predetermined heat treatment to develop the desired photochromic properties.

U.S. Pat. Nos. 4,018,965, 4,130,437, and 4,168,339 disclose glass compositions which can be drawn into glass sheet and which are potentially photochromic in such configuration. Those glass compositions demonstrate a viscosity at the liquidus of at least $10^4$ poises, commonly $10^4-10^6$ poises, and manifest long term stability against devitrification when in contact with platinum metal at temperatures corresponding to glass viscosities in the range of $10^4-10^6$ poises. This resistance to crystallization is required to permit the forming of glass sheet since the sheet forming methods conventional in the glass art do not rapidly quench the glass melt as occurs in commercial glass pressing operations. Hence, slow cooling of the glass hazards the development of turbidity or haze in the glass due to the growth of crystals therein.

The operable ranges of glass compositions disclosed in those three patents are tabulated below in terms of weight percent on the oxide basis.

| | 4,018,965 | 4,130,437 | 4,168,339 |
|---|---|---|---|
| $SiO_2$ | 54-66 | 54-66 | 54-66 |
| $Al_2O_3$ | 7-15 | 7-15 | 7-16 |
| $B_2O_3$ | 10-25 | 10-25 | 10-30 |
| $Li_2O$ | 0.5-4 | 0.5-4 | 0-4 |

-continued

|  | 4,018,965 | 4,130,437 | 4,168,339 |
|---|---|---|---|
| Na$_2$O | 3.5–15 | 3.5–15 | 3–15 |
| K$_2$O | 0–10 | 0–10 | 0–10 |
| Li$_2$O + Na$_2$O + K$_2$O | 6–16 | 6–16 | — |
| PbO | 0–3 | 0–1.25 | 0.4–1.5 |
| Ag | 0.1–1 | 0.1–0.3 | >0.03–1 |
| Cl | 0.1–1 | 0.2–1 | 0.5–1.2 |
| Br | 0–3 | 0–0.3 | 0.2–0.5 |
| CuO | 0.008–0.16 | 0.002–0.02 | 0.008–0.03 |
| F | 0–2.5 | 0–2.5 | 0.2–0.5 |

With regard to the photochromic characteristics displayed by the compositions disclosed in each patent, the glasses of U.S. Pat. No. 4,018,965 are asserted to exhibit at ambient temperatures, viz., 20°–25° C., a clear luminous transmittance of at least 60%, a darkened luminous transmittance not exceeding 25%, and a fading rate such that the glass exhibits a faded luminous transmittance after a 5-minute fading interval from the darkened state of at least 1.5 times that of the darkened transmittance. The glasses of U.S. Pat. No. 4,130,437 are reported to display a clear luminous transmittance of at least 60% at temperatures of 20°–25° C., a darkened luminous transmittance below 30%, and a rate of fading such that the glass demonstrates a faded luminous transmittance after a 5-minute fading period from the darkened state of at least 1.75 times that of the darkened transmittance. Moreover, after a one-hour fading interval, the glass manifests a luminous transmittance in excess of 80% of its clear luminous transmittance. The glasses of U.S. Pat. No. 4,168,339 are stated to exhibit a darkened luminous transmittance below 50% at room temperature and a rate of fading such that, after five minutes' fading, the transmittance will have increased by at least 20 percentage units of transmission and, after one hour's fading, the glass will measure a luminous transmittance in excess of 80%.

The initial clear luminous transmittance levels of the glasses are in the vicinity of 90%. Where desired, however, tinting agents such as CoO and/or NiO can be incorporated into the glass compositions to reduce the initial clear luminous transmittance values to levels approaching 60%. Nevertheless, because the amount of tinting agent needed to impart the desired color to the glass is so small, the photochromic behavior of the glass is not significantly affected.

U.S. application Ser. No. 252,139, filed Apr. 8, 1981 in the names of George B. Hares, David J. Kerko, and David L. Morse under the title *Photochromic Glass Suitable for Microsheet and Simultaneous Heat Treatment and Shaping*, discloses glasses having a clear luminous transmittance of about 90% when free from tint, a darkened luminous transmittance below 25% at a temperature of 20° C., when free from tint and below 20% when the glass is tinted to a level of at least 75%, a fading rate at 20° C. such that the glass displays a faded luminous transmittance of at least twice that of the darkened transmittance after a five-minute fading interval from the darkened state, a darkened luminous transmittance at 40° C. below 45% when the glass is free from tint and below 40% when the glass is tinted to a level of at least 75%, and a fading rate at 40° C. such that the glass manifests a faded luminous transmittance of at least 1.75 times that of the darkened transmittance after a five-minute fading interval from the darkened state. Those glasses consist essentially, in terms of weight percent on the oxide basis,

| SiO$_2$ | 55–60 |
|---|---|
| Al$_2$O$_3$ | 9–10 |
| B$_2$O$_3$ | 19–20.5 |
| Li$_2$O | 2–2.5 |
| Na$_2$O | 2–3 |
| K$_2$O | 6–7 |
| PbO | 0.1–0.25 |
| Ag | 0.1–0.15 |
| Cl | 0.3–0.5 |
| Br | 0.05–0.15 |
| CuO | 0.0065–0.01 |

U.S. Pat. No. 4,102,693 discloses photochromic glasses having a half fading time of not more than one minute which have compositions free from barium and consist essentially, in terms of weight percent on the oxide basis, of

| SiO$_2$ | 31–59 |
|---|---|
| B$_2$O$_3$ | 18–28 |
| Al$_2$O$_3$ | 8–20 |
| Li$_2$O | 0–3 |
| Na$_2$O | 0–8 |
| K$_2$O | 0–16 |
| Li$_2$O + Na$_2$O + K$_2$O | 6–16 |
| MgO | 0–2.6 |
| P$_2$O$_5$ | 0–12 |
| ZrO$_2$ | 0–7 |
| TiO$_2$ | 0–5 |
| PbO | 0–7 |
| Ag$_2$O | 0.05–0.4 |
| Cl | 0.04–0.5 |
| Br | 0–1.0 |
| F | 0–0.2 |
| Cl + Br + F | 0.13–1 |
| CuO | 0–1 |

SUMMARY OF THE INVENTION

The primary objective of the instant invention is to produce a photochromic glass suitable for both ophthalmic and non-prescription applications which exhibits excellent chemical durability and displays a fast fading capability and an exceptionally low darkened luminous transmittance even in articles of thin cross section. For example, in cross sections of about 0.4 mm, the inventive glass evidences a clear luminous transmittance in excess of 90% when free from tint, a darkened luminous transmittance below about 45% at a temperature of 25° C. when free from tint and a darkened luminous transmittance below about 57% at a temperature of 40° C. when free from tint. Such darkened transmittances are substantially equivalent to values displayed by other photochromic glasses in cross sections of 1.5–2 mm. After being removed from the source of actinic radiation for a period of five minutes, the glass fades more than one-half of the transmittance units between the darkened luminous transmittance and the original luminous transmittance. The opalization and devitrification liquidus temperature-glass viscosity relationships of the inventive glass are not favorable for the drawing of sheet since phase separation and/or devitrification is hazarded when the glass is held for substantial periods of time at temperatures corresponding to glass viscosities in the range of $10^4$–$10^6$ poises. Consequently, the preferred method for forming shapes of the inventive glass contemplates pressing, although other forming means wherein the glass melt is cooled relatively quickly, such as vacuum molding and injection molding, can be operable.

The compositions of the inventive glasses may be deemed to be composed of two parts, viz., the base glass and the "photochromic elements". The "photochromic elements" consist of Ag, Br, Cl, PbO, and CuO which act in concert to impart photochromic properties to the glass. Because of the inherent relatively high volatility of those components, especially Ag, Br, and Cl, and the highly significant effect which very minor changes in the amounts thereof can exert upon the character of the photochromic behavior exhibited by the glass, their presence is monitored via chemical analyses. Accordingly, those constituents are reported as analyzed.

In summary, the inventive base glasses consist essentially, expressed in terms of weight percent on the oxide basis as calculated from the batch of

| | |
|---|---|
| $SiO_2$ | 52-59 |
| $B_2O_3$ | 18-23 |
| $Al_2O_3$ | 6-8 |
| $Li_2O$ | 1-2.5 |
| $Na_2O$ | 1-3 |
| $K_2O$ | 8-13 |
| $ZrO_2$ | 2-6 |
| $TiO_2$ | 0-3 | and contain, as analyzed in weight percent of

| | |
|---|---|
| Ag | 0.17-0.22 |
| Br | 0.06-0.12 |
| Cl | 0.29-0.35 |
| CuO | 0.012-0.019 |
| PbO | 0.1-0.15 |

Minor quantities of conventional colorants such as up to 1% total of at least one transition metal oxide, e.g., CoO, NiO, $Cr_2O_3$, $Fe_2O_3$, and $V_2O_5$, and/or up to 5% total of at least one rare earth oxide, e.g., $Er_2O_3$, $Ho_2O_3$, $Nd_2O_3$, and $Pr_2O_3$, may optionally be added to impart tint to the glass. Those ingredients exert a negligible effect, if any, upon the photochromic behavior of the glass.

Extreme care must be exercised to maintain the glass composition within the straitly-limited ranges delineated above. For example, 3-6% $ZrO_2$ insures good chemical durability and improves the fading rate of the glass. A level of silver below 0.17% adversely affects the darkening capability of the glass, whereas silver contents in excess of 0.22% retard the rate of fading manifested by the glass. The chlorine and bromine values must be held within the prescribed intervals; otherwise, the glass becomes highly temperature dependent, i.e., the darkening and fading behavior of the glass varies widely as the temperature of the ambient environment changes moderately. Furthermore, the demanded parameters of darkening and fading can be lost. CuO exerts a strong effect upon the rate of fading and temperature dependence displayed by the glass. For example, if the level of CuO is below the minimum, the rate of fading is severely reduced and temperature dependence becomes very high. When the CuO content exceeds the prescribed maximums, the glass becomes very temperature dependent. PbO plays a significant role in the darkening behavior exhibited by the glass. Where PbO is absent, the glasses darken quite poorly. At the other extreme, too much PbO leads to glasses which demonstrate very slow rates of fading. The addition of $TiO_2$ is useful in adjusting the refractive index of the glass.

Shapes of a desired configuration are formed from the inventive glass compositions in accordance with the following steps:

(a) a glass forming batch of the proper composition is melted;
(b) the melt is simultaneously cooled and a potentially photochromic glass article of a desired geometry shaped therefrom; and
(c) the glass article is exposed to a temperature between about 610°-670° C. for a period of time sufficient to develop photochromic properties therein, this time generally ranging about five minutes to one hour.

DESCRIPTION OF PREFERRED EMBODIMENTS

Table I reports several glass compositions, expressed in terms of weight percent on the oxide basis, illustrating the criticality of maintaining the components thereof within the above-cited, closely restricted ranges. The levels of $SiO_2$, $B_2O_3$, $Al_2O_3$, $ZrO_2$, $TiO_2$, $Li_2O$, $Na_2O$, and $K_2O$ are tabulated in weight percent as calculated from the batch (except for Examples 1 and 2 where those values are recorded as analyzed). The contents of Ag, Cl, Br, CuO, and PbO in all the compositions are listed as analyzed in weight percent.

The batches can be melted in accordance with conventional optical glass melting practices and temperatures. Thus, the batch is melted under oxidizing or neutral conditions at temperatures in the range of about 1250°-1425° C. Moldings having a diameter of about 71 mm and a thickness of about 3 to 6 mm were made from the melts. Discs of about 0.36-0.42 mm thickness and 32 mm diameter were ground and polished from those moldings and each was subjected to the heat treatment recited in the following table.

A measurement of the photochromic behavior demonstrated by the discs was obtained utilizing the solar simulator apparatus described in U.S. Pat. No. 4,125,775. The apparatus consists of a 150 watt xenon arc source fitted with a filter to modify the spectral output thereof so as to closely approximate the solar spectrum, especially in the ultraviolet, blue and red portions. The infrared region of the spectrum is attenuated with a layer of water of sufficient thickness to provide equal irradiance to that of the sun, but without great concern for its spectral distribution in that region. Details of the measuring technique are provided in U.S. Pat. No. 4,190,451, supra.

The transmittances of the discs during darkening and fading cycles at 25° and 40° C. are also listed in the following table. $T_o$ represents the original transmittance of the disc, $T_D$ designates the darkened transmittance of the disc after a 30-minute exposure in the solar simulator apparatus, and $T_F$ indicates the transmittance of the disc five minutes after its removal from the solar simulator apparatus.

TABLE I

| Components | 1 | 2 | 3 | 4 | 5 | 6 | 7 | 8 | 9 | 10 | 11 |
|---|---|---|---|---|---|---|---|---|---|---|---|
| $SiO_2$ | 56.3 | 56.3 | 54.7 | 54.7 | 54.7 | 53.2 | 53.9 | 59.3 | 54.7 | 59.3 | 54.7 |
| $B_2O_3$ | 19.8 | 20.1 | 21.5 | 21.5 | 21.5 | 21.0 | 21.3 | 19.8 | 21.5 | 19.8 | 21.5 |
| $Al_2O_3$ | 6.8 | 6.85 | 7.1 | 7.1 | 7.1 | 6.9 | 7.0 | 9.6 | 7.1 | 9.6 | 7.1 |

TABLE I-continued

| Components | 1 | 2 | 3 | 4 | 5 | 6 | 7 | 8 | 9 | 10 | 11 |
|---|---|---|---|---|---|---|---|---|---|---|---|
| $ZrO_2$ | 3.5 | 3.52 | 3.8 | 3.8 | 3.8 | 3.7 | 3.75 | — | 3.8 | — | 3.8 |
| $Li_2O$ | 1.9 | 1.76 | 1.8 | 1.8 | 1.8 | 1.8 | 1.8 | 2.2 | 1.8 | 2.2 | 1.8 |
| $Na_2O$ | 1.4 | 1.47 | 1.2 | 1.2 | 1.2 | 1.2 | 1.2 | 2.4 | 1.2 | 2.4 | 1.2 |
| $K_2O$ | 10.2 | 10.1 | 9.8 | 9.8 | 9.8 | 12.2 | 11.1 | 6.3 | 9.8 | 6.3 | 9.8 |
| Ag | 0.195 | 0.196 | 0.185 | 0.200 | 0.254 | 0.219 | 0.183 | 0.190 | 0.161 | 0.168 | 0.184 |
| Cl | 0.312 | 0.321 | 0.321 | 0.320 | 0.299 | 0.367 | 0.348 | 0.430 | 0.321 | 0.455 | 0.354 |
| Br | 0.091 | 0.091 | 0.104 | 0.090 | 0.087 | 0.106 | 0.076 | 0.090 | 0.093 | 0.079 | 0.100 |
| CuO | 0.017 | 0.015 | 0.013 | 0.014 | 0.013 | 0.011 | 0.013 | 0.013 | 0.012 | 0.013 | 0.013 |
| PbO | 0.13 | 0.133 | 0.117 | 0.120 | 0.11 | 0.12 | 0.12 | 0.13 | 0.12 | 0.127 | 0.110 |
| Sample thickness (mm) | 0.4 | 0.4 | 0.37 | 0.39 | 0.38 | 0.36 | 0.39 | 0.4 | 0.38 | 0.4 | 0.38 |
| $T_o$ | 92.8% | 92.5% | 92% | 92.5% | 92.5% | 92.5% | 93.0% | 92% | 92% | 92% | 91.5% |
| Heat treatment Temp. | 660° C. | 660° C. | 620° C. | 620° C. | 660° C. | 620° C. | 620° C. | 620° C. | 620° C. | 620° C. | 660° C. |
| Time | 15 min. | 15 min. | 25 min. | 25 min. | 15 min. | 25 min. | 25 min. | 25 min. | 25 min. | 25 min. | 15 min. |
| 25° C. Exposure | | | | | | | | | | | |
| $T_D$ | 39.9% | 39.2% | 45% | 41.7% | 40.2% | 45.4% | 44.8% | 43% | 44.3% | 43.7% | 43.1% |
| $T_F$ | 70.3% | 67.1% | 71.6% | 74.2% | 60.4% | 70.4% | 74.0% | 61.6% | 76.3% | 58.8% | 63.4% |
| 40° C. Exposure | | | | | | | | | | | |
| $T_D$ | 54.1% | 48% | 54.2% | 55.6% | 42.2% | 53.1% | 54.9% | 51% | 66% | 57.5% | 49% |
| $T_F$ | 84.4% | 83.5% | 86.4% | 85.0% | 80.0% | 80.8% | 87.0% | 76.4% | 90.5% | 85.6% | 80.7% |

An examination of the table clearly indicates the criticality of maintaining the glass compositions within the narrow ranges cited above. Hence, untinted glasses complying with the desired set of photochromic properties will, in cross sections of 0.4 mm, manifest a darkened luminous transmittance below about 45% at a temperature of 25° C. and a darkened luminous transmitance below about 57% at a temperature of 40° C. At each of those temperatures, the glasses fade more than one-half of the transmittance units between the darkened luminous trasmittance and the original luminous transmittance after being removed from the source of actinic radiation for five minutes. Stated in another way, the glasses exhibited a half fading time of less than five minutes.

To illustrate, Examples 1-4 demonstrate the demanded photochromic chracteristics, whereas the remaining exemplary glasses, having compositions close to, but outside of the the prescribed ranges, fail to meet the desired photochromic behavior in one or more respects. Example 1 constitutes the most preferred embodiment of the inventive glasses.

Table II provides a comparison of the photochromic properties demonstrated by Example 1 at a thickness of about 0.4 mm with those exhibited by lenses of 2 mm thickness marketed by Corning Glass Works under the trademark PHOTOGRAY EXTRA. The measurements were conducted in like manner to that described above for the foregoing Examples 1-11. Table II also illustrates effect which glass thickness has upon the photochromic character of the inventive glasses. Hence, measurements were conducted on a sample of Example 1 having a thickness of 1 mm.

TABLE II

| | Example 1 (0.4 mm) | PHOTOGRAY EXTRA | Example 1 (1 mm) |
|---|---|---|---|
| $T_o$ | 92.8 | 91.0 | 92.0 |
| 25° C. Exposure | | | |
| $T_D$ | 39.9 | 23.3 | 19.0 |
| $T_F$ | 70.3 | 64.7 | 61.1 |
| 40° C. Exposure | | | |
| $T_D$ | 54.1 | 38.0 | 33.3 |
| $T_F$ | 84.4 | 77.8 | 76.8 |

As can be discerned, Example 1 at a thickness of only 1 mm displays a photochromic behavior quite similar to the commercial lens at twice the thickness.

We claim:

1. A photochromic glass composition consisting essentially, expressed in terms of weight percent on the oxide basis is calculated from the batch, of

| | |
|---|---|
| $SiO_2$ | 52-59 |
| $B_2O_3$ | 18-23 |
| $Al_2O_3$ | 6-8 |
| $Li_2O$ | 1-2.5 |
| $Na_2O$ | 1-3 |
| $K_2O$ | 8-13 |
| $ZrO_2$ | 2-6 |
| $TiO_2$ | 0-3 | and containing, as analyzed in weight percent, of

| | |
|---|---|
| Ag | 0.17-0.22 |
| Br | 0.06-0.12 |
| Cl | 0.29-0.35 |
| CuO | 0.012-0.019 |
| PbO | 0.1-0.15 | demonstrating, in 0.4 mm cross section, a clear luminous transmittance in excess of 90%, a darkened luminous transmittance below about 45% at a temperature of 25° C., a darkened luminous transmittance below about 57% at a temperature of 40° C., and a half fading time at both temperatures of about five minutes.

2. A photochromic glass composition according to claim 1 consisting essentially, expressed in terms of weight percent on the oxide basis as calculated from the batch, of about

| | |
|---|---|
| $SiO_2$ | 56.3 |
| $B_2O_3$ | 19.8 |
| $Al_2O_3$ | 6.8 |
| $Li_2O$ | 1.9 |
| $Na_2O$ | 1.4 |
| $K_2O$ | 10.2 |
| $ZrO_2$ | 3.5 | and containing, as analyzed in weight percent, of

| | |
|---|---|
| Ag | 0.195 |
| CuO | 0.017 |
| Cl | 0.312 |
| Br | 0.091 |
| PbO | 0.13 |

* * * * *